(12) United States Patent
Takagaki et al.

(10) Patent No.: US 6,732,868 B2
(45) Date of Patent: May 11, 2004

(54) PRODUCTION METHOD AND APPARATUS FOR FILTER, FORMING DIE FOR FILTER, FORMING ASSEMBLY FOR FORMING FILTER, AND FILTER

(75) Inventors: Takanari Takagaki, Kariya (JP); Koushin Wakayama, Kariya (JP)

(73) Assignee: Toyoda Boshoku Corporation, Kariya (JP)

( * ) Notice: Subject to any disclaimer, the term of this patent is extended or adjusted under 35 U.S.C. 154(b) by 0 days.

(21) Appl. No.: 10/098,291

(22) Filed: Mar. 18, 2002

(65) Prior Publication Data

US 2002/0135106 A1 Sep. 26, 2002

(30) Foreign Application Priority Data

Mar. 21, 2001 (JP) ........................................ 2001-080924

(51) Int. Cl.⁷ .............................................. B01D 29/07
(52) U.S. Cl. .......................... 210/490; 55/486; 55/521; 210/493.1; 210/505; 210/508; 264/259; 264/555; 425/72.2; 425/325; 425/377; 425/470
(58) Field of Search .............................. 210/490, 493.1, 210/493.3, 503, 505, 506, 508; 264/259, 274, 555, 45.8, 45.9, 46.1; 425/72.2, 325, 376.1, 377, 403, 470; 55/482, 486, 488, 521, 525, 527; 29/896.62

(56) References Cited

U.S. PATENT DOCUMENTS

| | | | |
|---|---|---|---|
| 2,411,660 A | * | 11/1946 | Manning |
| 2,945,557 A | | 7/1960 | Powers |
| 3,727,292 A | * | 4/1973 | Nicely |
| 3,727,769 A | | 4/1973 | Scholl |
| 4,004,899 A | | 1/1977 | Giacovas |
| 4,005,957 A | | 2/1977 | Savich |
| 4,181,514 A | | 1/1980 | Lefkowitz et al. |
| 4,701,197 A | | 10/1987 | Thornton et al. |
| 4,915,897 A | | 4/1990 | Farrington et al. |
| 4,925,601 A | | 5/1990 | Vogt et al. |
| 5,039,431 A | | 8/1991 | Johnson et al. |
| 5,069,694 A | | 12/1991 | Cullen et al. |
| 5,076,774 A | | 12/1991 | Farrington et al. |
| 5,271,883 A | | 12/1993 | Timmons et al. |
| 5,512,172 A | | 4/1996 | Marble |
| 5,575,874 A | | 11/1996 | Griesbach, III et al. |
| 5,674,302 A | | 10/1997 | Nakayama et al. |
| 5,753,343 A | | 5/1998 | Braun et al. |
| 5,810,898 A | | 9/1998 | Miller |
| 5,888,442 A | | 3/1999 | Kometani et al. |
| 6,099,729 A | | 8/2000 | Cella et al. |
| 6,146,580 A | | 11/2000 | Bontaites, Jr. |
| 6,156,089 A | | 12/2000 | Stemmer et al. |
| 6,165,240 A | | 12/2000 | Hodge |
| 6,416,570 B2 | * | 7/2002 | Goto et al. ................... 96/134 |
| 6,454,827 B2 | | 9/2002 | Takagaki et al. |
| 6,582,213 B2 | * | 6/2003 | Michaelis ................... 425/125 |

FOREIGN PATENT DOCUMENTS

| | | |
|---|---|---|
| BE | 566 851 A | 8/1960 |
| EP | 0 383 616 A1 | 8/1990 |
| EP | 0 605 015 A1 | 7/1994 |
| EP | 0 692 294 A1 | 1/1996 |
| EP | 1 149 620 A2 | 10/2001 |
| FR | 2 704 564 A1 | 11/1994 |
| GB | 1 213 219 A | 11/1970 |
| JP | A 8-38834 | 2/1996 |
| JP | A 10-128020 | 5/1998 |
| WO | WO 00/20675 | 4/2000 |

* cited by examiner

Primary Examiner—Joseph Drodge
(74) Attorney, Agent, or Firm—Oliff & Berridge PLC

(57) ABSTRACT

A filter production method produces a filter having a shape substantially identical to the shape of a forming surface by extruding semi-molten fibers to the forming surface. When the semi-molten fibers are extruded to the forming surface, the semi-molten fibers are gathered to upstanding surface portions of the forming surface. Therefore, a sufficient amount of fibers can be layered onto the upstanding surface portions, so that the layering amount of fibers on the upstanding surface portions of the forming surface will not be considerably reduced in comparison with the layering amounts on other portions of the forming surface.

25 Claims, 16 Drawing Sheets

PRODUCTION METHOD AND APPARATUS FOR FILTER, FORMING DIE FOR FILTER, FORMING ASSEMBLY FOR FORMING FILTER, AND FILTER

INCORPORATION BY REFERENCE

The disclosure of Japanese Patent Application No. 2001-80924 filed on Mar. 21, 2001 including the specification, drawings and abstract is incorporated herein by reference in its entirety.

BACKGROUND OF THE INVENTION

1. Field of Invention

The invention relates to a filter that is formed so as to have a shape substantially identical to a shape of a forming surface by extruding semi-molten fibers to the forming surface, and also relates to a production method for the filter, a production apparatus for producing the filter, a forming die for the filter, and a forming assembly for forming the filter.

2. Description of Related Art

A sheet-shaped non-woven fabric is formed by receiving semi-molten fibers extruded from a spinning nozzle on a flat surface, such as a metallic mesh or the like, and reeling the layer of fibers formed on the metallic mesh or the like. Thus, a non-woven fabric is formed. In order to produce a filter from such a non-woven fabric, it is necessary to perform the steps of cutting the non-woven fabric into a predetermined shape and folding and adhering the cut pieces.

In order to omit the aforementioned steps of cutting, folding, adhesion, etc., a filter 80 is often formed by producing from a metallic mesh or the like a forming die 90 that has a forming surface 92 that is shaped substantially identically to the filter 80, and extruding semi-molten fibers F from a spinning nozzle onto the forming surface 92 of the forming die so as to form a layer as shown in FIGS. 15A and 15B. FIG. 15B is a sectional view taken on line 15B—15B in FIG. 15A.

However, in the above-described method in which semi-molten fibers F are extruded onto the forming surface 92 shaped substantially identically to the filter 80, the amount of fibers F layered on upstanding surface portions 92k that are steep slope portions of the forming surface 92 becomes considerably less than the amount of fibers F layered on bent portions 92n or gentle slope portions 92m of the forming surface 92. Therefore, a side plate portion 86 of the filter 80 formed by the upstanding surface portions 92k of the forming surface 92 has a considerably smaller fiber density than an accordion plate portion 84 of the filter 80 formed by the gentle slope portions 92m and the like of the forming surface 92. That is, the side plate portion 86 of the filter 80 has a rough grain of fibers, and tends to allow dust leakage, in comparison with the accordion plate portion 84.

SUMMARY OF THE INVENTION

It is an object of the invention to reduce dust leakage through fibers laylered on upstanding portions of the forming surface.

A first aspect of the invention relates to a production method for producing a filter that has a shape substantially identical to a shape of a forming surface, by extruding semi-molten fibers to the forming surface, the production method comprising the step of gathering the fibers toward an upstanding surface portion of the forming surface when extruding the semi-molten fibers to the forming surface.

According to the first aspect, when semi-molten fibers are extruded to the forming surface, fibers are gathered to the upstanding surface portion of the forming surface. Therefore, a sufficient amount of fibers can be layered on the upstanding surface portion. Hence, the layering amount of fibers on the upstanding surface portion of the forming surface will not become considerably smaller than the layering amounts on other portions of the forming surface. Thus, the grain of fibers of the side plate portion of the filter formed by the upstanding surface portion does not become rougher than that of other portions of the filter. Therefore, dust leakage through the side plate portion becomes unlikely.

A second aspect of the invention relates to a production method for producing a filter that has a shape substantially identical to a shape of a forming surface, by extruding semi-molten fibers to the forming surface, the production method comprising the step of reducing gaps between fibers layered on the upstanding surface portion of the forming surface after the semi-molten fibers are extruded to the forming surface. Therefore, the grain roughness of the side plate portion of the filter can be made less than or equal to the grain roughness of the filtering portion, so that dust leakage through the side plate portion of the filter can be reduced.

A third aspect of the invention relates to a production method for producing a filter that has a filtering portion for filtering a fluid, and a side plate portion that closes two opposite sides of the filtering portion, by providing a frame body that becomes the side plate portion, and disposing inside the frame body a forming surface for forming the filtering portion, and extruding semi-molten fibers to the frame body and the forming surface. Therefore, it is easy to set the grain roughness of the side plate portion of the filter at a desired value, and it is possible to reduce the dust leakage through the side plate portion.

A fourth aspect of the invention relates to a filter produced by any one of the first to third aspect described above. This filter reduces the dust leakage through the side plate portion of the filter.

A fifth aspect of the invention relates to an apparatus for producing a filter, comprising a conveyor that carries and conveys a forming die having a forming surface for forming the filter, an extruder that extrudes semi-molten fibers to the forming die carried on the conveyor, and a device that gathers the fibers toward an upstanding surface portion of the forming surface when the extruder extrudes the semi-molten fibers to the forming die. Using this apparatus, a sufficient amount of semi-molten fibers can be layered on the upstanding surface portion of the forming die.

A sixth aspect of the invention relates to a forming die for forming a filter, including a slope surface portion for forming a filtering portion of the filter, and an upstanding surface portion for forming a side plate portion of the filter that closes two opposite sides of the filtering portion. A slope angle of the upstanding surface portion relative to a horizontal plane is set smaller than or equal to a slope angle of the slope surface portion relative to the horizontal plane. Therefore, it becomes possible to layer on the upstanding surface portion an amount of semi-molten fibers that is greater than or equal to the amount of semi-molten fibers layered on the slope surface portion.

A seventh aspect of the invention relates to a forming assembly that has a forming surface, and that forms a filter which has a filtering portion for filtering a fluid and a side plate portion that closes two opposite sides of the filtering portion, by extruding semi-molten fibers onto the forming surface. The forming assembly has a frame body that becomes the side plate portion, and a forming die disposed inside the frame body, for forming the filtering portion of the filter. If this forming assembly is used, the frame body becomes the side plate portion of the filter. Therefore, the grain roughness of the side plate portion can be adjusted based on the frame body.

A eighth aspect of the invention relates to a filter formed so as to have a shape substantially identical to a shape of a forming surface by extruding semi-molten fibers to the forming surface. The filter has a filtering portion for filtering a fluid, and a side plate portion that closes two opposite sides of the filtering portion. A grain roughness of the side plate portion is less than or equal to a grain roughness of the filtering portion. As the grain roughness of the side plate portion is less than or equal to the grain roughness of the filtering portion, the dust leakage through the side plate portion of the filter is reduced.

An ninth aspect of the invention relates to a filter formed so as to have a shape substantially identical to a shape of a forming surface by extruding semi-molten fibers to the forming surface. The filter has a filtering portion for filtering a fluid, and a side plate portion that closes two opposite sides of the filtering portion. An air flow resistance of the side plate portion is greater than or equal to an air flow resistance of the filtering portion. The increased air flow resistance of the side plate portion reduces the amount of air that flows through the side plate portion, and therefore reduces the dust leakage through the side plate portion. The air flow resistance of the side plate portion can be made greater than the air flow resistance of the filtering portion by, for example, forming the filter through the use of the forming die described in conjunction with the seventh aspect of the invention.

A tenth aspect of the invention relates to a filter formed so as to have a shape substantially identical to a shape of a forming surface by extruding semi-molten fibers to the forming surface. The filter has a filtering portion for filtering a fluid, and a side plate portion that closes two opposite sides of the filtering portion. A thickness of the side plate portion is greater than or equal to a thickness of the filtering portion. Therefore, since the thickness of the side plate portion is greater than or equal to the thickness of the filtering portion, the dust leakage through the side plate portion is reduced.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

First Embodiment

A filter production method, a filter production apparatus and a filter in accordance with a first embodiment of the invention will be described below with reference to FIGS. 1 to 10.

Figure 7:
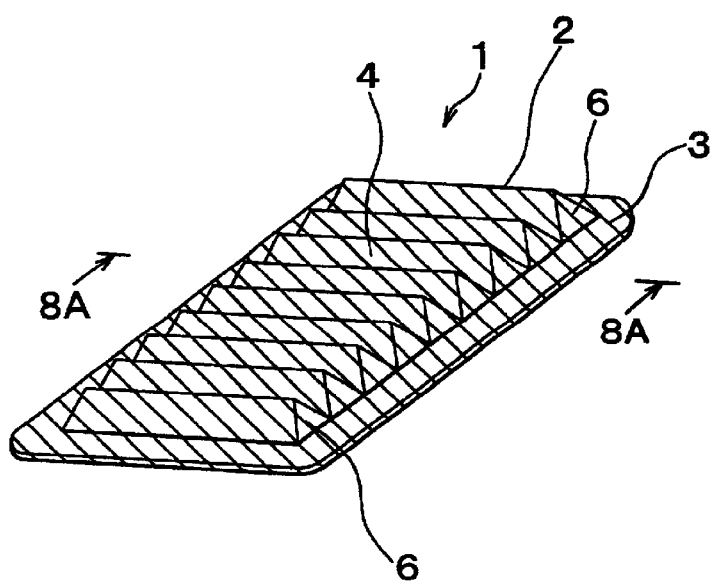
FIG. 7 is a perspective view of a filter produced by the filter production method in accordance with the first embodiment of the invention.

As shown in FIG. 7, a filter 1 is made up of a filter body 2 and a peripheral portion 3 extending around the filter body 2. The filter 1 is set in a housing (not shown) by clamping the peripheral portion 3 in a clamp portion of the housing. The filter body 2 has an open-container shape (a shape formed by a series of triangular prisms in which a face not shown in the illustration is open) formed by an accordion-like filtering portion 4 for filtering a fluid, and triangular side plate portions 6 that close two opposite sides of the filter portion 4.

The filter body 2 and the peripheral portion 3 are formed as one unit by extruding half-molten fibers F from a spinning nozzle 14 so as to form a layer on forming surfaces 31, 32 of a forming die 30 as described below (see FIG. 1).

Next, with reference to FIGS. 1 to 6, the apparatus for producing the filter 1 will be described, and then a method for producing the filter 1 by using the apparatus will be described.

Figure 1:
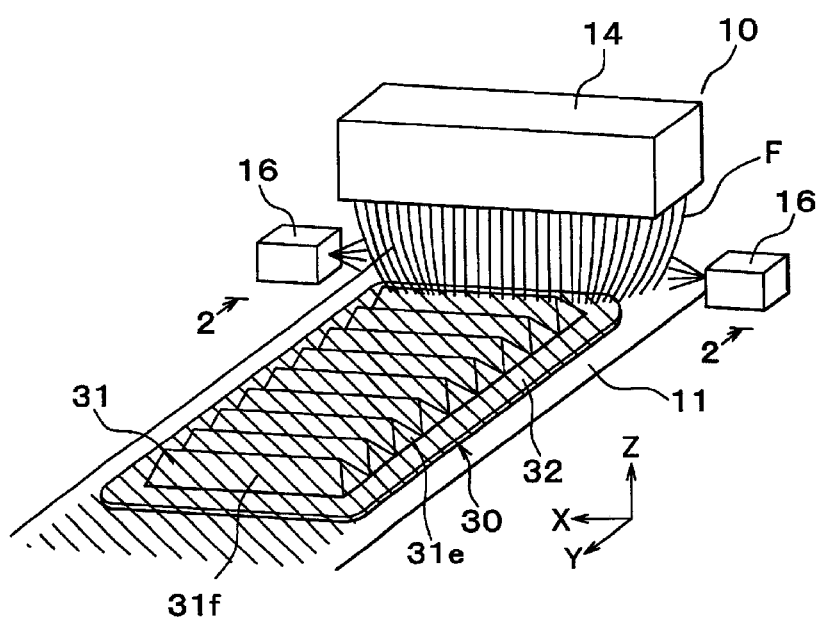
FIG. 1 is a perspective view illustrating a production method for a filter in accordance with a first embodiment of the invention; taken along the line 2—2 of FIG. 1
Figure 2:
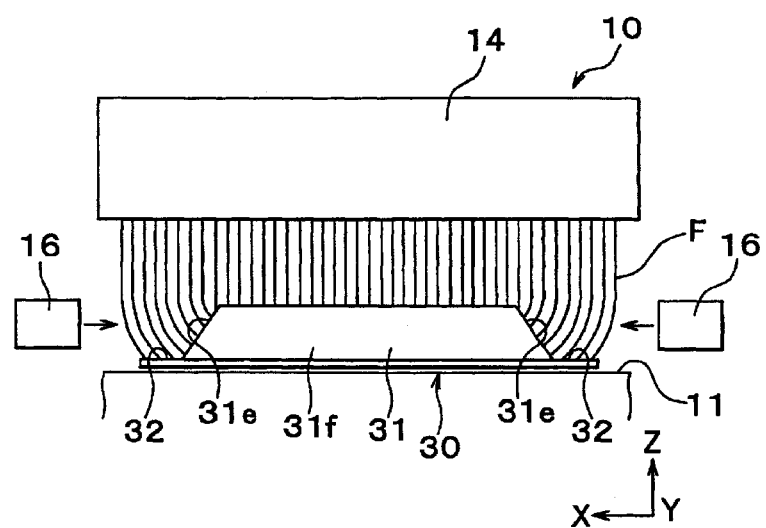
FIG. 2 is an elevation viewed along the line 2—2 of FIG. 1.

The filter producing apparatus 10 has a horizontal conveyor 11 as shown in FIG. 1 among others. A plurality of forming dies 30 (only one die is shown in FIG. 1) are arranged on the conveyor 11 in the direction of conveyance. The following description will be made on assumptions that a direction of the width of the conveyor 11 is an X direction, the direction of conveyance of the conveyor 11 is a Y direction, and a direction of the height of the conveyor 11 is a Z direction.

Figure 5A:
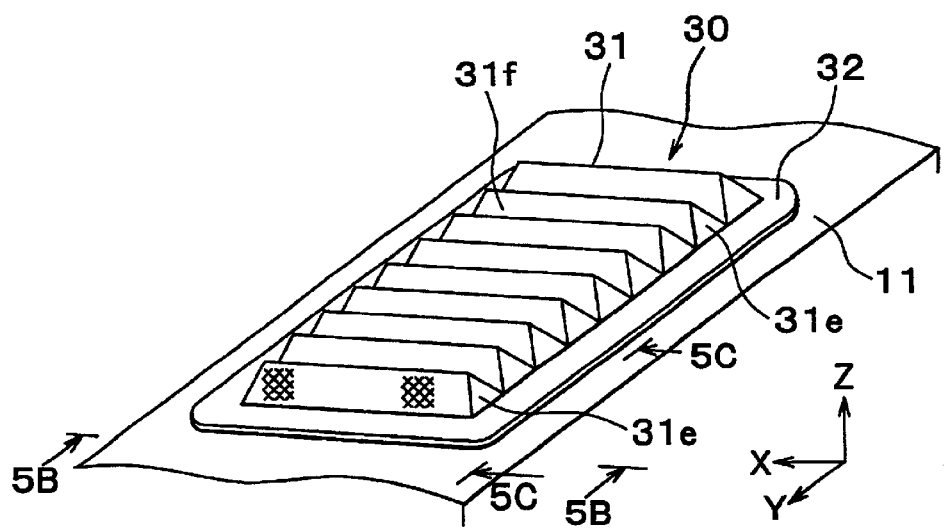
FIG. 5A is a perspective view of a forming die for use in the filter production method in accordance with the first embodiment.

Each forming die 30 is formed by a metallic mesh that has air permeability. As shown in FIG. 5A, a filter body forming surface 31 for forming the filter body 2 and a peripheral portion forming surface 32 for forming the peripheral portion 3 of the filter 1 are formed on an upper side of the forming die 30. The filter body forming surface 31 is made up of accordion-like slope surface portions 31$f$ for forming the filtering portion 4 of the filter body 2, and upstanding surface portions 31$e$ for forming side plate portions 6 of the filter body 2. The forming die 30 is disposed on the conveyor 11 in such a manner that the upstanding surface portions 31$e$ extend along two sides of the conveyor 11 that are opposite in the direction of the width of the conveyor 11.

Figure 5B:
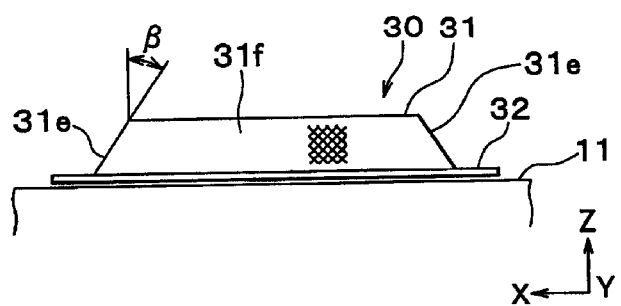
FIG. 5B is a side view taken along the line 5B—5B in FIG. 5A.
Figure 5C:
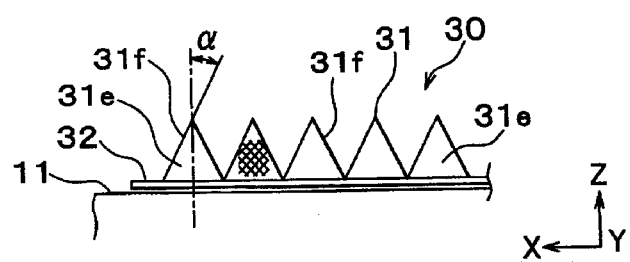
FIG. 5C is an elevation viewed along the line 5C—5C in FIG. 5A.

Furthermore, as indicated in FIGS. 5B and 5C, an angle $\alpha$ of each slope surface portion 31$f$ of the filter body forming surface 31 of the forming die 30 is set with respect to a vertical line, and an angle $\beta$ of each upstanding surface portion 31$e$ is set with respect to a vertical line. The slope angle (90°−$\alpha$) of the slope surface portions 31$f$ with respect to a horizontal plane is set equal to the slope angle (90°−$\beta$) of the upstanding surface portions 31$e$ with respect to the horizontal plane.

As shown in FIG. 1, the spinning nozzle 14 is disposed at a predetermined height above the conveyor 11 so as to extrude semi-molten fibers in the fashion of a curtain extending in the directions of the width of the conveyor 11 (X direction). The spinning nozzle 14 is, for example, a nozzle that adopts a melt blow method, and extrudes semi-molten fiber-shaped resin F (hereinafter, referred to as "resin F") injected from an extruder (not shown) onto the filter body forming surface 31 and the peripheral portion forming surface 32 of the forming die 30. The extrusion range (extrusion width) of the spinning nozzle 14 in the X direction is set greater than the width of the forming die 30, and less than the width of the conveyor 11.

A pair of air blower devices 16 are provided at the opposite sides of the conveyor 11 in the direction of the width below the spinning nozzle 14. The air blower devices 16 eject air toward the upstanding surface portions 31$e$ of the forming die 30 on the conveyor 11. The air blower devices 16 perform the function of gathering fibers F that tend to fall from the upstanding surface portions 31$e$ toward the opposite end portions of the conveyor 11 with respect to the direction of the width (i.e., toward the peripheral portion forming surface 32) to the positions of the upstanding surface portions 31$e$ by air pressure. That is, the fibers F ejected from the spinning nozzle 14 fall in the fashion of a curtain across the conveyor 11. Fibers F in two side end portions of the curtain receive air pressure from the air blower devices 16 when falling to the vicinity of the forming die 30. Therefore, the fibers F in the two side end portions are bent toward the upstanding surface portions 31$e$ of the forming die 30 while falling. Hence, the fibers F in the two side end portions of the curtain are layered on the upstanding surface portions 31$e$ or the peripheral portion forming surface 32 of the forming die 30 without landing off the border of the forming die 30, even though the fiber extrusion width of the spinning nozzle 14 is set greater than the width of the forming die 30.

A method for producing the filter 1 will next be described.

First, the spinning nozzle 14 extrudes semi-molten fibers F at a substantially constant rate. The conveyor 11 is driven so as to move the forming die 30 at a constant speed in the Y direction while the two air blower devices 16 are blowing out a predetermined amount of air. Therefore, the semi-molten fibers F are layered onto the filter body forming surface 31 and the peripheral portion forming surface 32 of the forming die 30, continuously from the leading edge of the forming die 30 in the Y direction.

As described above, the fibers F extruded from the spinning nozzle 14 fall in the fashion of a curtain across the conveyor 11, and the fibers F in two side end portions of the curtain receive air pressure from the air blower devices 16. Therefore, the fibers F in the two side end portions of the curtain, while falling, are bent toward the upstanding surface portions 31$e$ of the forming die 30. That is, the fibers F in the two side end portions of the curtain are gathered to the positions of the upstanding surface portions 31$e$ of the forming die 30 by the function of the air blower devices 16. In this manner, sufficient amounts of fibers F can be layered on the upstanding surface portions 31$e$, that is, the layering amount of fibers on the upstanding surface portions 31$e$ becomes greater than the layering amount of fibers on the slope surface portions 31$f$ of the filter body forming surface 31.

It should be noted that the slope angle (90°−$\alpha$) of the slope surface portions 31$f$ with respect to a horizontal plane is set equal to the slope angle (90°−$\beta$) of the upstanding surface portions 31$e$ with respect to the horizontal plane as mentioned above. Therefore, even if the air blower devices 16 are not provided, the layering amount of fibers on the upstanding surface portions 31$e$ is substantially equal to the layering amount of fibers on the slope surface portions 31$f$.

Figure 8A:
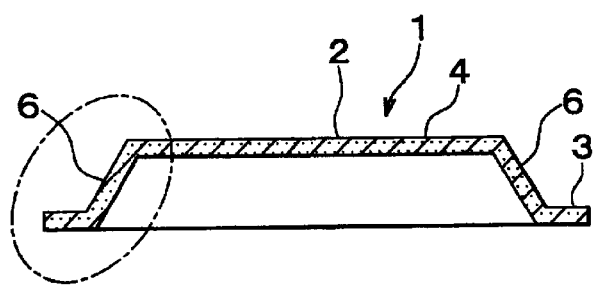
FIG. 8A is a sectional view taken along the line 8A—8A in FIG. 7.
Figure 8B:
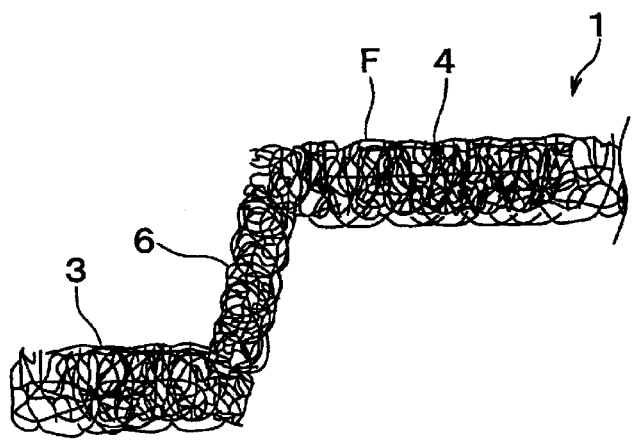
FIG. 8B is an enlarged view of a portion of the filter encircled by a dotted line in FIG. 8A.

The semi-molten fibers F layered on the filter body forming surface 31 and the peripheral portion forming surface 32 of the forming die 30 contact one another and fuse at contact points thereof. The layer of the fibers F thus forms a non-woven fabric, and therefore the filter 1 is formed as shown in FIGS. 8A and 8B.

That is, the fibers F layered on the slope surface portions 31$f$ of the filter body forming surface 31 of the forming die 30 form the filtering portion 4 of the filter body 2, and the fibers F layered on the upstanding surface portions 31$e$ of the filter body forming surface 31 form the side plate portions 6 of the filter body 2. Furthermore, the fibers F layered on the peripheral portion forming surface 32 of the forming die 30 form the peripheral portion 3 of the filter 1.

After the fibers F of the formed filter 1 solidify, the filter 1 is removed from the forming die 30, and is subjected to a finishing process. The filter 1 is thus completed.

According to the production method for the filter 1 in accordance with this embodiment, fibers F can be gathered toward the upstanding surface portions 31e of the filter body forming surface 31 of the forming die 30 by the function of the air blower devices 16. Therefore, even if the slope of the upstanding surface portions 31e is great, the layering amount of fibers on the upstanding surface portions 31e does not become less than the layering amount of fibers on other sites. Hence, the fibers in the side plate portions 6 of the filter 1 formed by the upstanding surface portions 31e do not make a coarser grain than the fibers in other portions, so that the possibility of dust leakage through the side plate portions 6 is reduced.

In this embodiment, the filter 1 is produced by using the forming die 30, in which the upstanding surface portions 31e and the slope surface portions 31f have equal slope angles, and also by using the air blower devices 16.

Figure 6A:
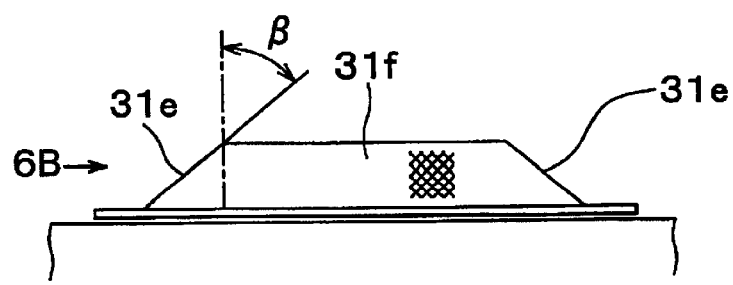
FIG. 6A is a side view illustrating a modification of the forming die.
Figure 6B:
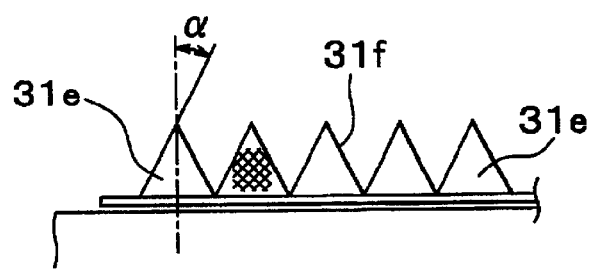
FIG. 6B is an elevation viewed in the direction indicated by an arrow 6B in FIG. 6A.

However, it is also possible to set the slope angle (90°−β) of the upstanding surface portions 31e smaller than the slope angle (90°−α) of the slope surface portions 31f with respect to a horizontal plane as indicated in FIGS. 6A and 6B. In this case, since the slope angle (90°−β) of the upstanding surface portions 31e of the filter body forming surface 31 of the forming die 30 is set smaller than the slope angle (90°−α) of the slope surface portions 31f of the filter body forming surface 31, it becomes possible to layer on the upstanding surface portions 31e an amount of fibers F that is greater than or equal to the layering amount of fibers on the slope surface portions 31f. That is, the wall thickness of the side plate portions 6 of the filter 1 will become greater than or equal to the wall thickness of the filtering portion 4, so that dust leakage through the side plate portions 6 of the filter 1 can be further prevented. The employment of this forming die 30 makes it possible to layer (gather) the fibers F on the upstanding surface portions 31e and the slope surface portions 31f to substantially equal thicknesses without using the air blower devices 16.

The employment of the air blower devices 16 makes it possible to layer on the upstanding surface portions of a forming die an amount of fibers F that is greater than or equal to the layering amount of fibers on the slope surface portions even if the slope angle of the upstanding surface portions of the forming die is steeper than the slope angle of the slope surface portions 31f (such a forming die is not shown).

Figure 3:
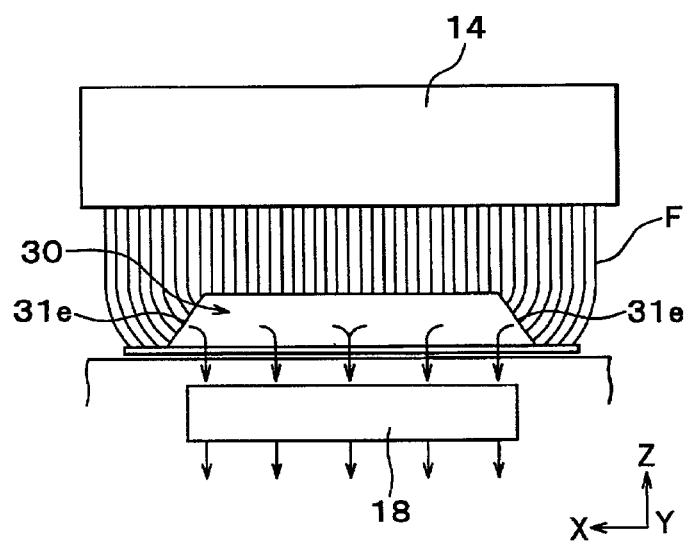
FIG. 3 is an elevation illustrating a modification of the filter production method in accordance with the first embodiment.
Figure 4:
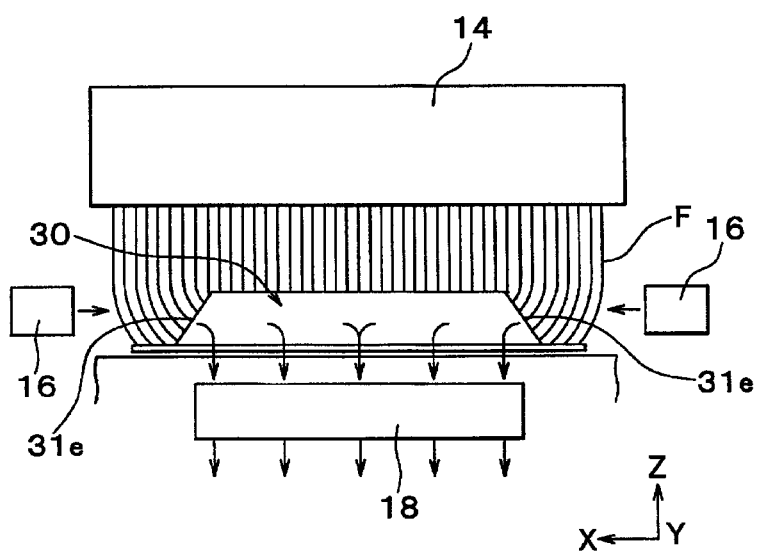
FIG. 4 is an elevation illustrating another modification of the filter production method in accordance with the first embodiment.

In this embodiment, the air blower devices 16 are used to gather two side end portions of the curtain-like fibers F extruded from the spinning nozzle 14 toward the upstanding surface portions 31e of the forming die 30. However, it is also possible to adopt a method as shown in FIG. 3 in which the air blower devices 16 are replaced by an air suction device 18 that is disposed against the forming die 30 opposite to the spinning nozzle 14, and air is drawn mainly through the upstanding surface portions 31e of the forming die 30 so as to gather fibers F toward the upstanding surface portions 31e. Furthermore, it is possible to adopt a method in which the air blower devices 16 and the air suction device 18 are employed as shown in FIG. 4.

Figure 9:
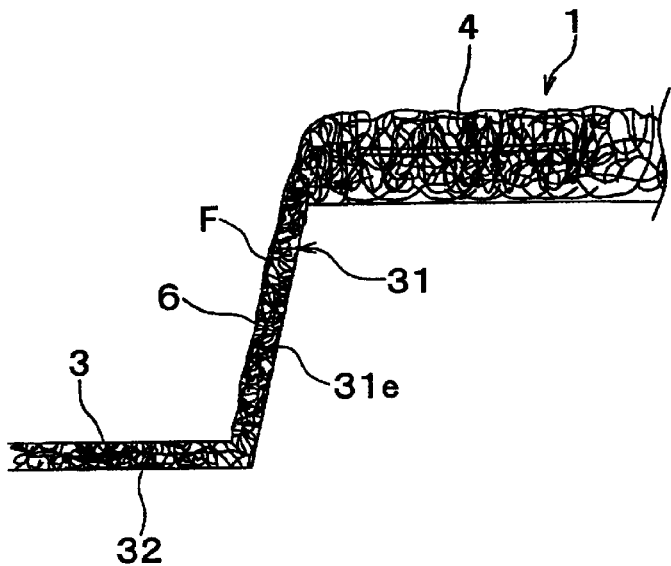
FIG. 9 is a sectional view showing a state where a side plate portion and a peripheral portion of the filter are pressed.

Furthermore, after semi-molten fibers F are extruded onto the filter body forming surface 31 and the peripheral portion forming surface 32 of the forming die 30, the fibers F layered on the upstanding surface portions 31e of the filter body forming surface 31 and the fibers F layered on the peripheral portion forming surface 32 may be pressurized by pressing or the like as shown in FIG. 9. By pressing the layered fibers F in this manner, it becomes possible to reduce the gaps between fibers in a certain portion if the layering amount of fibers in that portion is small. Thus, the dust leakage through the side plate portions 6 of the filter 1 can be reduced. Furthermore, the strength of the side plate portions 6 and the peripheral portion 3 of the filter 1 increases.

Figure 10:
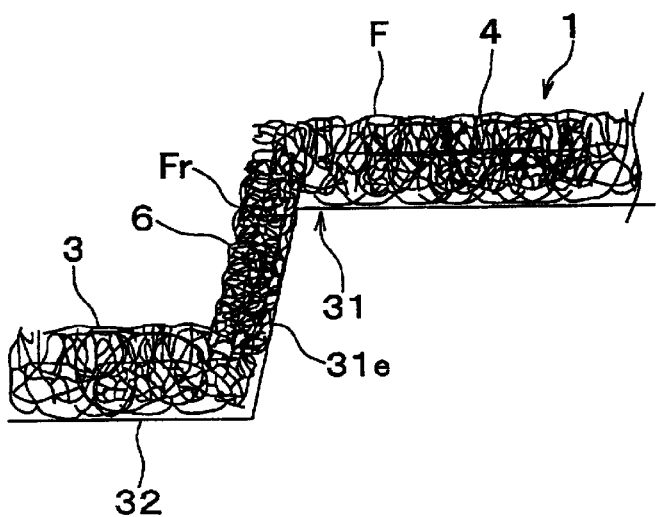
FIG. 10 is a sectional view showing a state where a side plate portion of the filter is impregnated with an impregnating material.

Still further, after semi-molten fibers F are extruded onto the filter body forming surface 31 and the peripheral portion forming surface 32 of the forming die 30, the fibers F layered on the upstanding surface portions 31e of the filter body forming surface 31 may be impregnated with an impregnating material Fr as indicated in FIG. 10. By impregnating the layered fibers F in a certain portion with the impregnating material Fr in this manner, it becomes possible to reduce the gaps between fibers in that portion even if the layering amount of fibers F in the portion is small. The impregnation in this manner also reduces the dust leakage through the side plate portions 6 of the filter 1. Furthermore, the strength of the side plate portions 6 of the filter 1 also increases. The impregnating material Fr is preferably a resin (molten state or solution state) of the same kind as the fibers F.

According to the first embodiment, the layering amount of fibers on the upstanding surface portions of the forming surface does not become considerably smaller than that in other portions of the forming surface. Therefore, the inter-fiber gaps in the side plate portions of the filter formed by the upstanding surface portions of the forming surface do not become greater than the inter-fiber gaps in other portions of the filter. Therefore, dust leakage through the side plate portions of the filter becomes unlikely.

Second Embodiment

Filter production methods and filters in accordance with a second embodiment of the invention and modifications of the second embodiment will be described below with reference to FIGS. 11A to 14B. In the filter production method in accordance with this embodiment, a side plate portion of a filter is formed by using a pre-formed frame body. The frame body functions as a portion of a forming assembly for forming a filter.

Figure 11A:
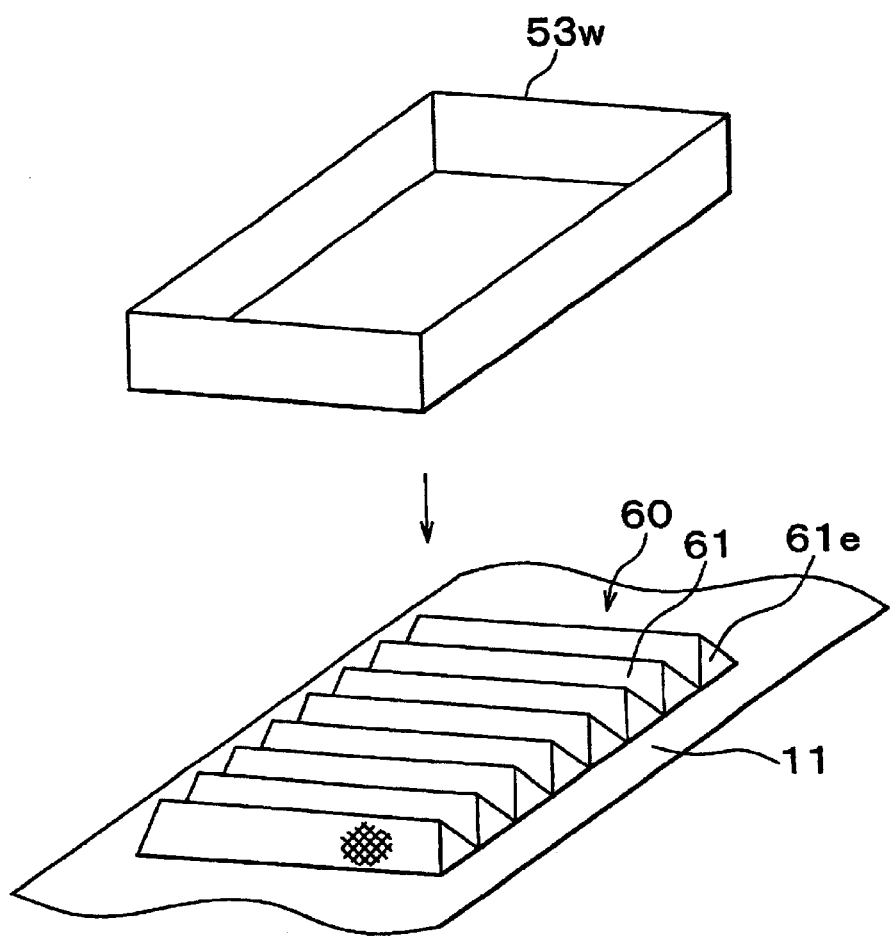
FIG. 11A is a perspective view illustrating a production method for a filter in accordance with a second embodiment of the invention.
Figure 11B:
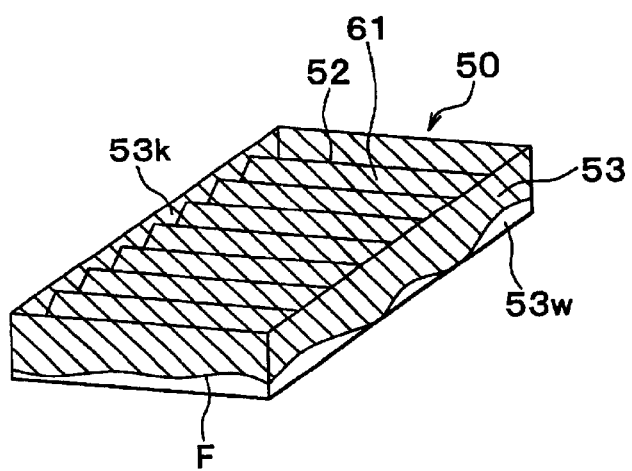
FIG. 11B is a perspective view of a filter produced by the filter production method in accordance with the second embodiment.

A filter 50 is formed by a filtering portion 52 for filtering a fluid and a side plate portion 53 formed around the filtering portion 52 as shown FIG. 11B. The filtering portion 52 has an accordion-like shape. The periphery of the filtering portion 52 is connected to an inner peripheral wall surface 53k of the side plate portion 53. This connection is accomplished by fusion and solidification of semi-molten fibers extruded on and around the boundary between a frame body 53w and a forming die 60 in a state where the semi-molten fibers F are fused to each other.

Next, an apparatus for producing the filter 50 will be described with reference to FIG. 11A, and then a method for producing the filter 50 using the apparatus will be described. The spinning nozzle, the conveyor, etc. that are used in the production of the filter 50 are the same as those used in the first embodiment, and will not be described again.

The filtering portion 52 of the filter 50 is formed by ejecting semi-molten fibers F onto the forming die 60. The forming die 60 is formed by an air-permeable metallic mesh. Provided in an upper portion of the forming die 60 are accordion-like slope surface portions 61 for forming the filtering portion 52. Similar to the filter body forming surface 31 of the first embodiment, the forming die 60 is also provided with sloped upstanding surface portions 61e.

The side plate portion 53 of the filter 50 is formed by ejecting semi-molten fibers F onto the angular tube-shaped frame body 53w. The frame body 53w is formed by, for example, the injection molding of a resin that is a material of the fibers F. The size of the frame body 53w is set such that the forming die 60 can be held inside the frame body 53w.

Although in this embodiment, the forming die 60 has the sloped upstanding surface portions 61e, it is also possible to adopt a construction in which the entire periphery of the forming die 60 tightly contacts the inner peripheral walls of the frame body 53w and the forming die 60 does not have upstanding surface portions 61e.

Next described will be a production method for the filter 50.

First, the frame body 53w and the forming die 60 held inside the frame body 53w are set at a predetermined position on the conveyor 11. Next, the conveyor 11 is driven so as to move the forming die 60 and the frame body 53w together below the spinning nozzle (not shown) at a constant speed in the Y direction. Therefore, semi-molten fibers F are layered onto the slope surface portions 61 and the upstanding surface portions 61e of the forming die 60 and the frame body 53w, continuously from the leading edge of the forming die 60 in the Y direction. If air blower devices 16 as shown in FIG. 1 are disposed at opposite sides of the forming die 60, and blow semi-molten fibers toward the frame body 53w, the layering amount of fibers on the frame body 53w can be increased. The layering amount of fibers on forward and rearward portions of the frame body 53w in the direction of conveyance of the conveyor 11 can be adjusted by adjusting the driving speed of the conveyor 11 in the Y direction. For example, if the speed of the conveyor 11 is reduced when the forward and rearward portions of the frame body 53w are being coated with fibers F, the layering amount of fibers on the forward and rearward portions of the frame body 53w can be increased.

The semi-molten fibers F layered on the slope surface portions 61 of the forming die 60 and the frame body 53w contact one another and fuse at contact points thereof. The layer of the fibers F thus forms a non-woven fabric, and therefore the filter 50 is formed. That is, the semi-molten fibers F layered on the slope surface portions 61 of the forming die 60 form the filtering portion 52 of the filter 50, and the frame body 53w and the semi-molten fibers F layered on the frame body 53w become the side plate portion 53 of the filter 50. After the semi-molten fibers F forming the filter 50 solidify, the filter 50 is removed from the slope surface portions 61 of the forming die 60. Thus, the filter 50 (see FIG. 11B) in which the fibers F and the frame body 53w are integrated is completed.

Therefore, since the pre-formed frame body 53w is used to form the side plate portion 53 of the filter 50, this method makes it possible to set the strength of the side plate portion 53 and the like at desired values. The frame body enhances the strength of the filter, and reduces deformation of the filter caused by, for example, negative pressure of the passing fluid. Furthermore, the frame body 53w, forming a portion of the side plate portion 53, reduces the dust leakage (passage of dust) through the side plate portion 53. The frame body 53w may be formed by an air-permeable mesh material.

Furthermore, it is possible to use the forming die 60 as a portion of the filter 50 instead of removing the forming die 60 from the filter 50. If in this case, the frame body is an air-permeable mesh member, it is preferable that the grain of the mesh-type frame body be set finer than the grain of the mesh-type slope surface portions 61 so that the grain roughness of the side plate portion attained after the formation of the filter becomes less than or equal to the grain roughness of the filtering portion attained after the formation of the filter. As for an example of the aforementioned grain roughness of the mesh-type frame body, the grain may be as fine as or finer than the grain of the filtering portion formed by the fibers layered on the slope surface portions.

If the forming die is used as a portion of the filter and the frame body is an air-permeable mesh member, it is preferable that the air flow resistance of the mesh-type frame body be greater than the air flow resistance of the mesh-type slope surface portions 61 so that the air flow resistance of the side plate portion attained after the formation of the filter becomes greater than or equal to the air flow resistance of the filtering portion attained after the formation of the filter. With this setting of air flow resistance, the frame body increases the air flow resistance of the side plate portion 53, so that the amount of air that passes through the side plate portion 53 reduces and the dust leakage through the side plate portion reduces.

If the frame body and the forming die are utilized as portions of the filter (i.e., component members of the filter), the step of removing the filter from the forming die is omitted from the filter production process. Therefore, the production of the filter is facilitated.

Furthermore, if a mesh-type frame body is used, the fibers layered on the frame body may be pressed to reduce the inter-fiber gaps, and furthermore, the fibers layered on the frame body may be impregnated with an impregnating material (e.g., a molten or semi-molten resin) to reduce the inter-fiber gaps.

Making the grain of the frame body finer than the grain of the mesh-type slope surface portions (forming die) and making the air flow resistance of the frame body greater than the air flow resistance of the mesh-type slope surface portions (forming die) include forming the frame body as a plate that has no holes.

Figure 12A:
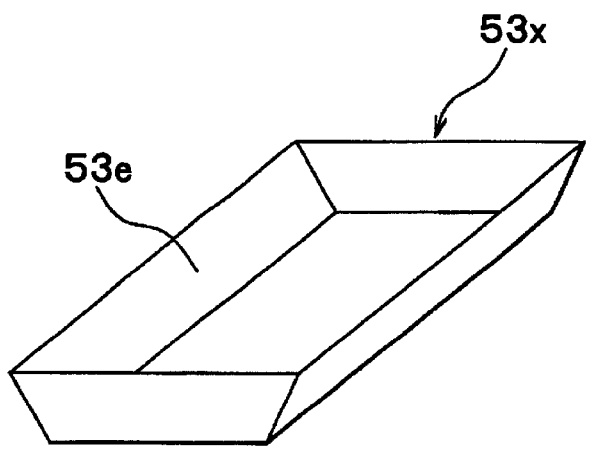
FIG. 12A is a perspective view of a frame body for use in a first modification of the filter production method in accordance with the second embodiment.
Figure 12B:
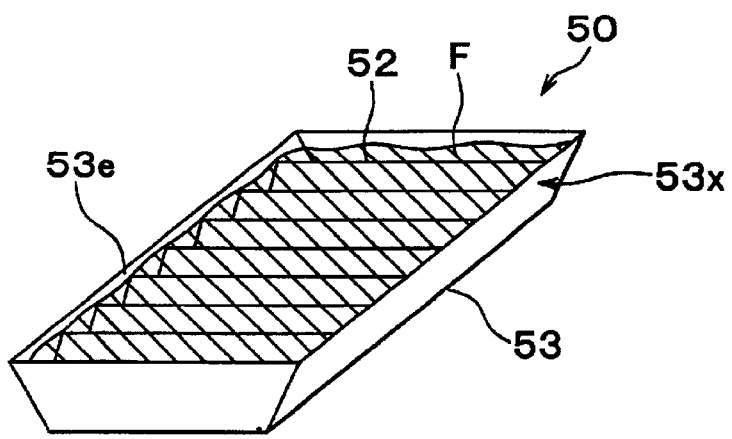
FIG. 12B is a perspective view of a filter produced by the first modification.

Although in the second embodiment, the angular tube-shaped frame body 53w is used, it is also possible to use a tapered frame body 53x that is expanded upward (i.e., a frame body that is expanded with respect to the direction of ejection of semi-molten fibers) (a first modification of the second embodiment) as shown in FIGS. 12A and 12B. The use of the frame body 53x makes it possible to efficiently layer fibers F between an inner wall surface 53e of the frame body 53x and the slope surface portions 61 of the forming die 60 (not shown), so that the characteristic of adhesion between the side plate portion 53 and the filtering portion 52 of the filter 50 improves.

Figure 13A:
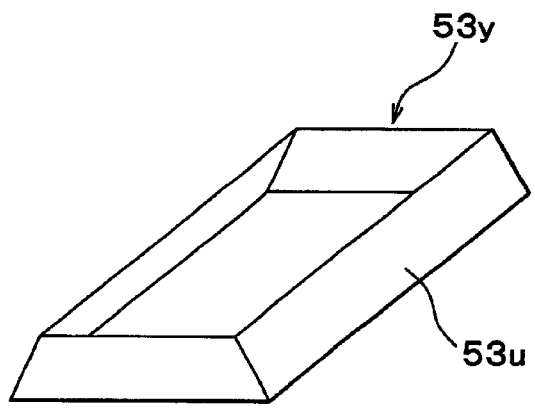
FIG. 13A is a perspective view of a frame body for use in a second modification of the filter production method in accordance with the second embodiment.
Figure 13B:
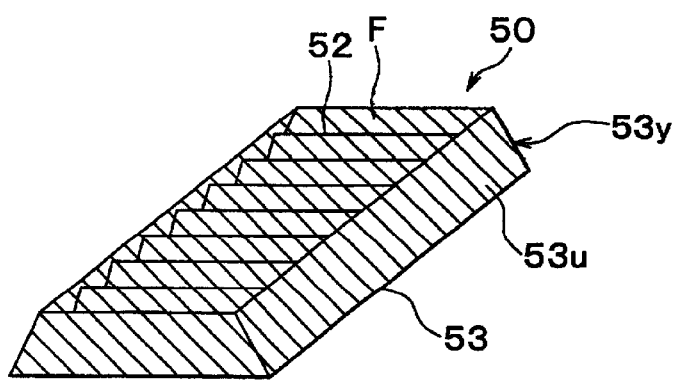
FIG. 13B is a perspective view of a filter produced by the second modification.

Furthermore, it is possible to use a tapered frame body 53y that is expanded downward (i.e., a frame body that is narrowed with respect to the direction of ejection of semi-molten fibers) (a second modification of the second embodiment) as shown in FIGS. 13A and 13B. The use of the frame body 53y makes it possible to efficiently layer fibers F on an outer wall surface 53u of the frame body 53y, so that the characteristic of adhesion between the side plate portion 53 and the filtering portion 52 of the filter 50 improves. The forming die may be removed from the filter, or may be incorporated as a portion of the filter.

Figure 14A:
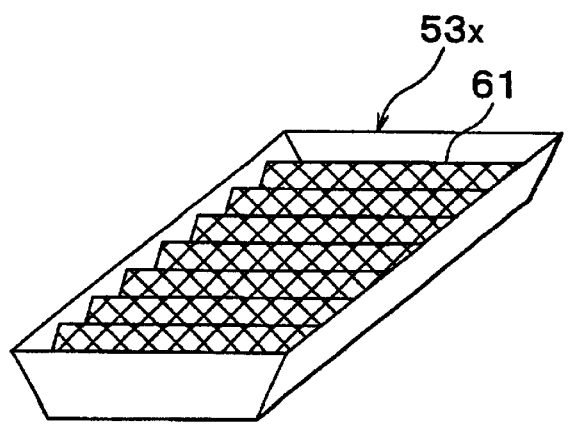
FIG. 14A is a perspective view of a frame body and a forming die for use in a third modification of the filter production method in accordance with the second embodiment.
Figure 14B:
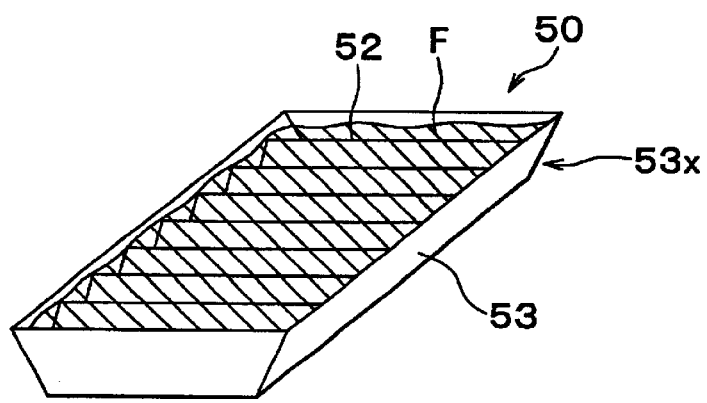
FIG. 14B is a perspective view of a filter produced by the third modification.
Figure 15A:
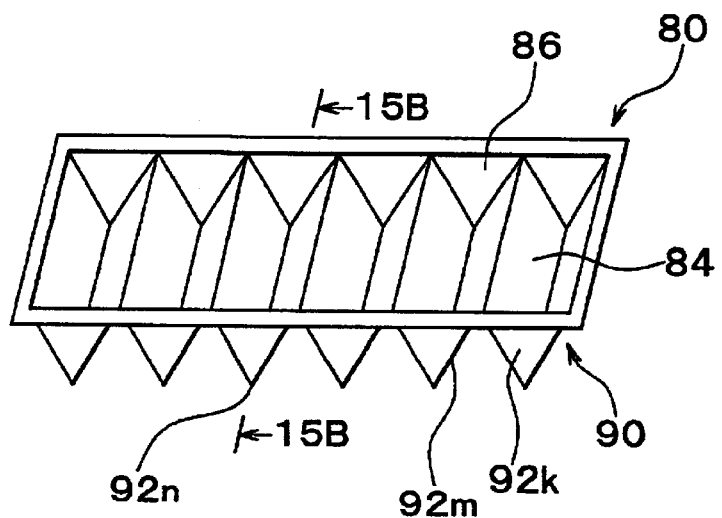
FIG. 15A is a perspective view of a filter in accordance with a related art.
Figure 15B:
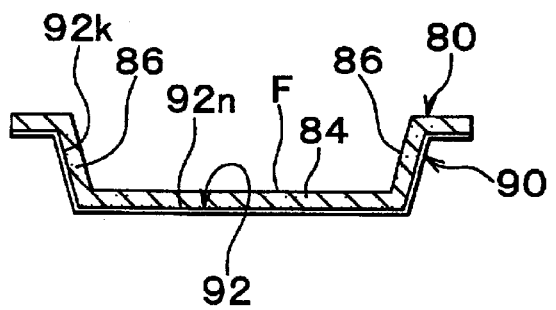
FIG. 15B is a sectional view taken along the line 15B—15B in FIG. 15A.

Furthermore, as shown in FIGS. 14A and 14B, the tapered frame body 53x expanded upward and the accordion-like slope surface portions 61 for forming the filtering portion 52 may be adhered beforehand, and fibers F may be layered on the frame body 53x and the slope surface portions 61 (a third modification of the second embodiment). In this manner, the filter 50 in which the fibers F, the frame body 53x and the slope surface portions 61 are integrated can be formed. Therefore, since the frame body 53x and the slope surface portions 61 are adhered beforehand, the strength between the side plate portion 53 and the filtering portion 52 of the filter 50 increases. Furthermore, owing to the function of the slope surface portions 61, the strength of the filtering portion 52 can also be increased. It is preferable that the slope surface portions 61 have a mesh configuration formed by the same material resin as the side plate portion 53. In the second embodiment, too, the frame body 53w and the slope surface portions 61 may be adhered beforehand, and fibers F may be layered on the frame body 53w and the slope surface portions 61.

Although in the second embodiment, the frame body 53w and like members are formed by injecting a resin (FIG. 11A), it is also possible to form the frame body 53w and the like by, for example, bending a non-woven fabric. In the modifications of the second embodiment, too, the frame bodies 53x, 53y may be formed using a non-woven fabric.

Furthermore, although in the second embodiment and the modifications thereof, the forming die 60 is formed by a metallic mesh, it is also possible to form the forming die 60 from a non-woven fabric or the like, and form a filter in which the forming die 60 and the fibers F layered thereon are integrated.

Furthermore, in the modifications of the second embodiment in which the frame body has a tapered shape, the taper angle of the frame body 53x, 53y with respect to a horizontal plane may be equal to the angle ($\beta$ in FIG. 5B) of the upstanding surface portions (not shown) of the forming die. It is also possible to adopt a construction in which the entire periphery of the frame body tightly contacts the forming die so that no gap is formed between the frame body and the forming die, instead of providing an upstanding surface portion. That is, it is possible to adopt a construction in which the frame body functions as an upstanding surface portion.

While the invention has been described with reference to preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. A production method for producing a filter that has a shape substantially identical to a shape of a forming surface, comprising:
    extruding semi-molten fibers to the forming surface, the forming surface having a filter-forming portion for forming a filtering portion of the filter, the filter-forming portion having an undulating shape with concavities and convexities; and
    gathering the semi-molten fibers toward an upstanding surface portion of the forming surface when extruding the semi-molten fibers to the forming surface, the upstanding surface portion located peripherally to rising and falling portions of the undulating shape.

2. The production method according to claim 1, wherein the gathering of the semi-molten fibers is accomplished by ejecting a gas toward the upstanding surface portion of the forming surface.

3. The production method according to claim 1, wherein the gathering of the semi-molten fibers is accomplished by drawing an air from the upstanding surface portion of the forming surface.

4. The production method according to claim 1, wherein the upstanding surface portion is for forming a side plate portion of the filter that closes two opposite sides of the filtering portion, and wherein the gathering of the semi-molten fibers is accomplished by using the forming surface having the upstanding surface portion whose slope angle relative to a horizontal plane is smaller than or equal to a slope angle of the rising and falling portions relative to the horizontal plane.

5. A filter produced by the production method defined in claim 1.

6. The production method according to claim 1, wherein the filtering portion is accordion shaped.

7. The production method according to claim 1, wherein the semi-molten fibers are forcibly gathered toward the upstanding surface portion.

8. A production method for producing a filter that has a shape substantially identical to a shape of a forming surface, comprising:
    extruding semi-molten fibers onto the forming surface; and
    reducing gaps between fibers layered on an upstanding surface portion of the forming surface after extruding the semi-molten fibers so that the gaps between the fibers layered on the upstanding surface portion are smaller than a between fibers layered on a slope surface portion that forms a filtering portion of the filter.

9. The production method according to claim 8, wherein the gaps between the fibers on the upstanding surface portion are reduced by pressing fibers that become a side plate portion of the filter.

10. The production method according to claim 8, wherein the gaps between the fibers on the upstanding surface portion are reduced by impregnating fibers that become a side plate portion of the filter with an impregnating material.

11. A filter produced by the production method defined in claim 8.

12. A production method for producing a filter that has a filtering portion for filtering a fluid, and a side plate portion that closes two opposite sides of the filtering portion, comprising:
    providing a frame body that becomes the side plate portion, and disposing inside the frame body a forming surface for forming the filtering portion; and
    extruding semi-molten fibers to the frame body and the forming surface, the forming surface having an undulating shape with concavities and convexities.

13. The production method according to claim 12, wherein:
    the forming surface is formed on a forming die; and
    the production method further comprises removing the forming die from the filter after the extruding of the semi-molten fibers.

14. The production method according to claim 12, wherein:
    the forming surface is formed on a forming die;
    the forming die becomes a portion of the filter; and
    a grain roughness of the side plate portion attained after formation of the filter is made less than or equal to a grain roughness of the filtering portion attained after the formation of the filter by providing the frame body with a grain roughness that is less than a grain roughness of the forming die by at least a predetermined value.

15. The production method according to claim 12, wherein:
    the forming surface is formed on a forming die;

the forming die becomes a portion of the filter; and an air flow resistance of die side plate portion attained after formation of the filter is made greater than or equal to an air flow resistance of the filtering portion attained after the formation of the filter by providing the frame body with an air flow resistance that is greater than an air flow resistance of the forming die by at least a predetermined value.

16. A filter produced by the production method defined in claim 12.

17. The production method according to claim 12, wherein the filtering portion is accordion shaped.

18. The production method according to claim 12, wherein the semi-molten fibers are extruded on both inside and outside surfaces of the frame body.

19. A production method for producing a filter that has a filtering portion for filtering a fluid, and a side plate portion that closes two opposite sides of the filtering portion, comprising:

providing a frame body that becomes the side plate portion, and disposing inside the frame body a forming surface for forming the filtering portion; and extruding semi-molten fibers to the frame body and the forming surface, wherein the frame body is a tapered frame body that is expanded with respect to a direction of extrusion of the semi-molten fibers.

20. A production method for producing a filter that has a filtering portion for filtering a fluid, and a side plate portion that closes two opposite sides of the filtering portion, comprising:

providing a frame body that becomes the side plate portion, and disposing inside the frame body a forming surface for forming the filtering portion; and extruding semi-molten fibers to the frame body and the forming surface, wherein the frame body is a tapered frame body that is narrowed with respect to a direction of extrusion of the semi-molten fibers.

21. An apparatus for producing a filter, the apparatus comprising:

a conveyor that carries and conveys a forming die for forming the filter;

an extruder that extrudes semi-molten fibers to a forming surface of the forming die carried on the conveyor, the forming surface having a filter-forming portion for forming a filtering portion of the filter, the filter-forming portion having an undulating shape with concavities and convexities; and a device that gathers the semi-molten fibers toward an upstanding surface portion of the forming surface when the extruder extrudes the semi-molten fibers to the forming die, the upstanding surface portion located peripherally to rising and falling portions of the undulating shape.

22. The apparatus according to claim 21, wherein the device that gathers the semi-molten fibers forcibly gathers the semi-molten fibers toward the upstanding surface portion.

23. A filter formed so as to have a shape substantially identical to a shape of a forming surface and formed by a process comprising extruding semi-molten fibers to the forming surface, the filter comprising:

a filtering portion for filtering a fluid, the filtering portion having an undulating shape with concavities and convexities; and a side plate portion that closes two opposite sides of the filtering portion;

wherein a grain roughness of the side plate portion is less than or equal to a grain roughness of the filtering portion.

24. A filter formed so as to have a shape substantially identical to a shape of a forming surface and formed by a process comprising extruding semi-molten fibers to the forming surface, the filter comprising:

a filtering portion for filtering a fluid, the filtering portion having an undulating shape with concavities and convexities; and a side plate portion that closes two opposite sides of the filtering portion;

wherein an air flow resistance of the side plate portion is greater than or equal to an air flow resistance of the filtering portion.

25. A filter formed so as to have a shape substantially identical to a shape of a forming surface and formed by a process comprising extruding semi-molten fibers to the forming surface, the filter comprising:

a filtering portion for filtering a fluid, the filtering portion having an undulating shape with concavities and convexities; and a side plate portion that closes two opposite sides of the filtering portion;

wherein a thickness of the side plate portion is greater than or equal to a thickness of the filtering portion.

* * * * *